(12) United States Patent
Majumdar et al.

(10) Patent No.: US 8,617,333 B2
(45) Date of Patent: *Dec. 31, 2013

(54) PNEUMATIC TIRE HAVING BUILT-IN SEALANT LAYER AND PREPARATION THEREOF

(75) Inventors: Ramendra Nath Majumdar, Hudson, OH (US); Aaron Scott Puhala, Kent, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 1012 days.

This patent is subject to a terminal disclaimer.

(21) Appl. No.: 11/858,491

(22) Filed: Sep. 20, 2007

(65) Prior Publication Data

US 2009/0078352 A1    Mar. 26, 2009

(51) Int. Cl.
*B60C 19/12* (2006.01)
*B29C 73/22* (2006.01)

(52) U.S. Cl.
USPC ............ 156/115; 152/502; 152/503; 523/166

(58) Field of Classification Search
USPC .......................... 156/115, 117, 397, 97, 123; 152/502–507, 510, 521; 523/166; 106/33
See application file for complete search history.

(56) References Cited

U.S. PATENT DOCUMENTS

| | | |
|---|---|---|
| 452,876 A | 5/1891 | Gray |
| 509,904 A | 12/1893 | Holt |
| 541,075 A | 6/1895 | Davids |
| 587,211 A | 7/1897 | Jones et al. |
| 1,217,888 A | 2/1917 | Wildman et al. |
| 1,239,291 A | 9/1917 | Morse et al. |
| 1,444,706 A | 2/1923 | Rosete |
| 2,062,638 A | 12/1936 | Campbell |
| 2,194,341 A | 3/1940 | Voorhees |
| 2,342,580 A | 2/1944 | Hartz |

(Continued)

FOREIGN PATENT DOCUMENTS

| | | |
|---|---|---|
| EP | 1174290 A1 | 1/2002 |
| EP | 1424222 A1 | 6/2004 |

(Continued)

OTHER PUBLICATIONS

English Language Abstract for JP 53-114882.*

(Continued)

*Primary Examiner* — Martin Rogers
(74) *Attorney, Agent, or Firm* — Wood, Herron & Evans, LLP

(57) ABSTRACT

In one embodiment, a pneumatic tire having a built-in sealant layer, before cure, includes an unvulcanized pneumatic tire assembly having an outer circumferential rubber tread and a supporting carcass. A precursor sealant layer is situated between the supporting carcass and an innermost rubber inner liner. The precursor sealant layer includes a non-flowing polyurethane composition that is neither gel-like nor tacky and is self-supporting. The precursor sealant layer, during curing of the unvulcanized pneumatic tire assembly, thermally degrades so as to provide a gel-like and tacky, self-healing polyurethane composition which defines the built-in sealant layer. The resulting tire, with its innermost polyurethane composition, allows for elimination or reduction in blister formation by reducing or elimination the amount of gases typically given off by organoperoxide-butyl based sealant layers, such as when the tire is at its running temperature. Consequently, the thickness of the inner liner may be reduced.

8 Claims, 1 Drawing Sheet

(56) References Cited

U.S. PATENT DOCUMENTS

| | | | |
|---|---|---|---|
| 2,523,695 A | 9/1950 | Greene | |
| 2,566,384 A | 9/1951 | Tilton, Jr. | |
| 2,699,811 A | 12/1951 | Trautman | |
| 2,587,470 A | 2/1952 | Herzegh | |
| 2,910,106 A | 9/1953 | Keefe | |
| 2,712,847 A | 7/1955 | Harris | |
| 2,752,978 A | 7/1956 | Kindle et al. | |
| 2,752,979 A | 7/1956 | Knill et al. | |
| 2,756,801 A | 7/1956 | Iknayan et al. | |
| 2,776,699 A | 1/1957 | Kindle et al. | |
| 2,782,829 A | 2/1957 | Peterson et al. | |
| 2,802,505 A | 8/1957 | Peterson et al. | |
| 2,811,190 A | 10/1957 | Iknayan et al. | |
| 2,818,902 A | 1/1958 | Schutz | |
| 2,827,098 A | 3/1958 | Semegen et al. | |
| 2,877,819 A | 3/1959 | Gibbs | |
| 2,905,220 A | 9/1959 | Schutz | |
| 2,935,109 A | 5/1960 | Railsback | |
| 2,953,184 A | 9/1960 | Erstad | |
| 3,048,509 A | 8/1962 | Sweet et al. | |
| 3,361,698 A | 1/1968 | Pace | |
| 3,449,155 A | 6/1969 | Fuller | |
| 3,563,294 A | 2/1971 | Chien | |
| 3,563,295 A | 2/1971 | Hough | |
| 3,628,585 A * | 12/1971 | Pace | 152/37 |
| 3,747,660 A | 7/1973 | Tibbals | |
| 3,860,539 A | 1/1975 | Miyazato | |
| 3,881,537 A | 5/1975 | Miyazato | |
| 3,881,943 A | 5/1975 | Fuller et al. | |
| 3,903,947 A | 9/1975 | Emerson | |
| 3,920,061 A | 11/1975 | Japp et al. | |
| 3,930,528 A | 1/1976 | Harrington | |
| 3,931,843 A | 1/1976 | Edwards et al. | |
| 3,935,893 A * | 2/1976 | Stang et al. | 152/504 |
| 3,938,573 A | 2/1976 | Hallenbeck | |
| 3,942,573 A | 3/1976 | Lawrence et al. | |
| 3,952,787 A | 4/1976 | Okado et al. | |
| 3,981,342 A | 9/1976 | Farber et al. | |
| 4,027,712 A | 6/1977 | Verdier | |
| 4,032,500 A | 6/1977 | Koch et al. | |
| 4,037,636 A | 7/1977 | Hagenbohmer et al. | |
| 4,057,090 A | 11/1977 | Hoshikawa et al. | |
| 4,064,922 A * | 12/1977 | Farber et al. | 152/504 |
| 4,068,027 A | 1/1978 | Van Ornum | |
| 4,090,546 A | 5/1978 | Honda et al. | |
| 4,094,353 A | 6/1978 | Ford | |
| 4,096,898 A | 6/1978 | Messerly et al. | |
| 4,101,494 A | 7/1978 | Kent et al. | |
| 4,109,695 A | 8/1978 | Miyazato | |
| 4,113,799 A | 9/1978 | Van Ornum et al. | |
| 4,115,172 A | 9/1978 | Baboff et al. | |
| 4,116,895 A | 9/1978 | Kageyama et al. | |
| 4,117,036 A | 9/1978 | Honda et al. | |
| 4,120,337 A | 10/1978 | Soma et al. | |
| 4,140,167 A | 2/1979 | Bohm et al. | |
| 4,148,348 A | 4/1979 | French et al. | |
| 4,149,579 A | 4/1979 | Senger | |
| 4,153,095 A | 5/1979 | Sarkissian | |
| 4,156,768 A * | 5/1979 | Cook | 525/453 |
| 4,161,202 A | 7/1979 | Powell et al. | |
| 4,163,207 A | 7/1979 | Dodd | |
| 4,171,237 A * | 10/1979 | Bohm et al. | 156/115 |
| 4,183,390 A | 1/1980 | Hallman | |
| 4,186,042 A | 1/1980 | Powell et al. | |
| 4,206,008 A | 6/1980 | Tacke et al. | |
| 4,206,796 A | 6/1980 | Chemizard | |
| 4,210,187 A | 7/1980 | Egan | |
| 4,213,491 A | 7/1980 | Pope et al. | |
| 4,214,619 A | 7/1980 | Bowerman, Jr. et al. | |
| 4,216,812 A | 8/1980 | Bourne | |
| 4,217,395 A | 8/1980 | Kuan et al. | |
| 4,224,208 A | 9/1980 | Kent | |
| 4,228,839 A * | 10/1980 | Bohm et al. | 152/504 |
| 4,252,377 A | 2/1981 | Muhammad | |
| 4,258,771 A | 3/1981 | Snyder | |
| 4,259,401 A | 3/1981 | Chahroudi et al. | |
| 4,262,624 A | 4/1981 | Soeda et al. | |
| 4,262,724 A | 4/1981 | Sarkissian | |
| 4,263,075 A | 4/1981 | Bowerman, Jr. et al. | |
| 4,274,466 A | 6/1981 | French et al. | |
| 4,276,898 A | 7/1981 | Ross | |
| 4,279,343 A | 7/1981 | Alfanta | |
| 4,281,621 A | 8/1981 | Tacke et al. | |
| 4,284,742 A | 8/1981 | Bowerman, Jr. et al. | |
| 4,286,643 A | 9/1981 | Chemizard et al. | |
| 4,287,928 A | 9/1981 | Hallman | |
| 4,289,089 A | 9/1981 | Tacke et al. | |
| 4,289,805 A | 9/1981 | Dubow | |
| 4,294,730 A | 10/1981 | Kenney | |
| 4,300,614 A | 11/1981 | Kageyama et al. | |
| 4,304,281 A | 12/1981 | Kenney | |
| 4,317,692 A | 3/1982 | Niconchuk | |
| 4,328,053 A | 5/1982 | Medlin, Jr. | |
| 4,340,104 A * | 7/1982 | Kuan | 152/521 |
| 4,351,382 A | 9/1982 | Corner et al. | |
| 4,356,214 A | 10/1982 | Soeda et al. | |
| 4,359,078 A | 11/1982 | Egan | |
| 4,388,261 A | 6/1983 | Codispoti et al. | |
| 4,391,317 A | 7/1983 | Savage | |
| 4,396,053 A | 8/1983 | Davis et al. | |
| 4,398,492 A | 8/1983 | Casey | |
| 4,398,583 A | 8/1983 | Casey | |
| 4,418,093 A | 11/1983 | Gomberg et al. | |
| 4,424,295 A | 1/1984 | Van Ornum et al. | |
| 4,426,468 A | 1/1984 | Ornum et al. | |
| 4,433,011 A | 2/1984 | Larson et al. | |
| 4,434,832 A | 3/1984 | Koch et al. | |
| 4,436,857 A | 3/1984 | Kuan et al. | |
| 4,443,279 A | 4/1984 | Sandstrom | |
| 4,444,294 A | 4/1984 | Yoshigai | |
| 4,445,562 A | 5/1984 | Bohm et al. | |
| 4,453,992 A | 6/1984 | Kuan et al. | |
| 4,455,011 A | 6/1984 | Levine | |
| 4,473,948 A | 10/1984 | Chadwick | |
| 4,501,825 A | 2/1985 | Magyar et al. | |
| 4,528,331 A | 7/1985 | Bohm et al. | |
| 4,539,344 A | 9/1985 | Van Ornum et al. | |
| 4,548,687 A | 10/1985 | Kitamura et al. | |
| 4,588,758 A | 5/1986 | Jaspon | |
| 4,607,065 A | 8/1986 | Kitamura et al. | |
| 4,607,675 A | 8/1986 | Patitsas et al. | |
| 4,616,048 A | 10/1986 | De Trano et al. | |
| 4,634,488 A | 1/1987 | Tournier | |
| 4,652,243 A | 3/1987 | Crosslen | |
| 4,658,876 A | 4/1987 | Augier | |
| 4,659,589 A | 4/1987 | Jimenez | |
| 4,664,168 A | 5/1987 | Hong et al. | |
| 4,665,963 A | 5/1987 | Timar et al. | |
| 4,678,375 A | 7/1987 | Gagle et al. | |
| 4,713,114 A | 12/1987 | Smith | |
| 4,739,724 A | 4/1988 | Giordano | |
| 4,743,468 A | 5/1988 | Jimenez | |
| 4,743,497 A | 5/1988 | Thorsrud | |
| 4,744,843 A | 5/1988 | Lewis | |
| 4,746,544 A | 5/1988 | Hogen-Esch | |
| 4,749,730 A | 6/1988 | Jimenez | |
| 4,765,367 A | 8/1988 | Scott | |
| 4,776,888 A | 10/1988 | Morrow | |
| 4,816,101 A | 3/1989 | Hong et al. | |
| 4,895,610 A | 1/1990 | Egan | |
| 4,899,826 A | 2/1990 | Penn | |
| 4,913,209 A | 4/1990 | Hong et al. | |
| 4,918,976 A | 4/1990 | Fogal et al. | |
| 4,919,183 A | 4/1990 | Dodson | |
| 4,928,741 A | 5/1990 | Rye et al. | |
| 4,934,426 A | 6/1990 | Remond et al. | |
| 4,957,573 A | 9/1990 | Gomberg | |
| 4,958,587 A | 9/1990 | Fogal, Sr. et al. | |
| 4,966,213 A | 10/1990 | Kawaguchi et al. | |
| 4,970,242 A | 11/1990 | Lehman | |
| 5,053,089 A | 10/1991 | Ristich | |
| 5,053,259 A | 10/1991 | Vicik | |
| 5,059,636 A | 10/1991 | Grenga | |
| 5,070,917 A | 12/1991 | Ferris et al. | |

(56) References Cited

U.S. PATENT DOCUMENTS

| | | |
|---|---|---|
| 5,085,942 A | 2/1992 | Hong et al. |
| 5,099,900 A | 3/1992 | Gomberg |
| 5,110,629 A | 5/1992 | Gomberg et al. |
| 5,116,449 A | 5/1992 | Fabris et al. |
| 5,124,395 A | 6/1992 | Abramowski et al. |
| 5,128,392 A | 7/1992 | DeTrano et al. |
| 5,178,701 A | 1/1993 | Taylor |
| 5,226,958 A | 7/1993 | Bowman et al. |
| 5,231,872 A | 8/1993 | Bowler et al. |
| 5,267,662 A | 12/1993 | Hayes |
| 5,284,895 A | 2/1994 | Gupta |
| 5,295,525 A | 3/1994 | Sanda, Jr. |
| 5,335,540 A | 8/1994 | Bowler et al. |
| 5,338,776 A | 8/1994 | Peelor et al. |
| 5,344,679 A | 9/1994 | Vicik |
| 5,364,463 A | 11/1994 | Hull |
| 5,365,779 A | 11/1994 | Vander Velde |
| 5,385,191 A | 1/1995 | Aflague et al. |
| 5,385,980 A * | 1/1995 | Schaefer et al. .............. 525/187 |
| 5,403,417 A | 4/1995 | Dudley et al. |
| 5,435,363 A | 7/1995 | Pender |
| 5,460,033 A | 10/1995 | Vander Velde |
| 5,466,049 A | 11/1995 | Harmsen |
| 5,480,945 A | 1/1996 | Vicik |
| 5,500,456 A | 3/1996 | Hughett et al. |
| 5,527,409 A | 6/1996 | Lanphier |
| 5,618,912 A | 4/1997 | Fang |
| 5,648,406 A | 7/1997 | Peelor et al. |
| 5,705,604 A | 1/1998 | Fang |
| 5,755,863 A | 5/1998 | Morrow |
| 5,765,601 A | 6/1998 | Wells et al. |
| 5,772,747 A | 6/1998 | Turner et al. |
| 5,800,643 A | 9/1998 | Frankowski |
| 5,834,534 A | 11/1998 | Adams et al. |
| 5,840,274 A | 11/1998 | Bishop |
| 5,846,620 A | 12/1998 | Compton |
| 5,855,972 A | 1/1999 | Kaeding |
| 5,856,376 A | 1/1999 | Wong |
| 5,908,145 A | 6/1999 | Jaksa |
| 5,909,752 A | 6/1999 | Gerresheim et al. |
| 5,916,931 A | 6/1999 | Adams et al. |
| 5,967,313 A | 10/1999 | Gabriel |
| 5,977,196 A | 11/1999 | Wicks |
| 6,013,697 A | 1/2000 | True et al. |
| 6,019,150 A | 2/2000 | Yamagiwa |
| 6,056,852 A | 5/2000 | Presti et al. |
| 6,122,810 A | 9/2000 | McInnes |
| 6,158,489 A | 12/2000 | Yamazaki et al. |
| 6,159,403 A | 12/2000 | Yamagiwa |
| 6,186,203 B1 | 2/2001 | Fone |
| 6,267,450 B1 | 7/2001 | Gamble |
| 6,270,602 B1 | 8/2001 | Johnston et al. |
| 6,271,305 B1 | 8/2001 | Rajalingam et al. |
| 6,334,918 B1 | 1/2002 | Yamagiwa et al. |
| 6,345,650 B1 | 2/2002 | Paasch et al. |
| 6,382,469 B1 | 5/2002 | Carter et al. |
| 6,418,991 B1 | 7/2002 | Trice |
| 6,431,225 B1 | 8/2002 | Dudley |
| 6,451,162 B2 | 9/2002 | Yamagiwa |
| 6,454,892 B1 | 9/2002 | Gerresheim et al. |
| 6,492,436 B2 | 12/2002 | Howe et al. |
| 6,500,286 B1 | 12/2002 | Ishikawa et al. |
| 6,502,308 B1 | 1/2003 | Carfora et al. |
| 6,506,273 B1 | 1/2003 | Hull |
| 6,508,898 B1 | 1/2003 | Rustad et al. |
| 6,530,409 B1 | 3/2003 | Ishikawa et al. |
| 6,536,553 B1 | 3/2003 | Scanlon |
| 6,538,060 B2 | 3/2003 | Rajalingam et al. |
| 6,557,603 B2 | 5/2003 | Yamazaki et al. |
| 6,557,604 B2 | 5/2003 | Albrecht |
| 6,568,443 B2 | 5/2003 | Shoner |
| 6,572,592 B1 | 6/2003 | Lopez |
| 6,579,584 B1 | 6/2003 | Compton |
| 6,605,654 B1 | 8/2003 | Fang et al. |
| 6,626,218 B1 | 9/2003 | Ochiai et al. |
| 6,668,875 B2 | 12/2003 | Kojima et al. |
| 6,672,352 B2 | 1/2004 | Yamagiwa et al. |
| 6,708,849 B1 | 3/2004 | Carter et al. |
| 6,726,386 B1 | 4/2004 | Gruenbacher et al. |
| 6,766,834 B1 | 7/2004 | Eckhardt |
| 6,780,904 B2 | 8/2004 | Dudley et al. |
| 6,782,931 B2 | 8/2004 | Koziatek |
| 6,786,364 B2 | 9/2004 | McBride |
| 6,786,990 B1 | 9/2004 | Yamagiwa |
| 6,789,581 B2 | 9/2004 | Cowen et al. |
| 6,806,478 B1 | 10/2004 | Hatfield |
| 6,837,287 B2 | 1/2005 | Smith, Sr. et al. |
| 6,866,735 B2 | 3/2005 | Yamagiwa |
| 6,868,881 B1 | 3/2005 | Yamagiwa |
| 6,889,723 B2 | 5/2005 | Gerresheim et al. |
| 6,911,104 B1 | 6/2005 | Hayashi |
| 6,915,826 B2 | 7/2005 | Poling et al. |
| 6,918,544 B2 | 7/2005 | Ferguson |
| 6,935,391 B2 | 8/2005 | Naito et al. |
| 6,938,651 B1 | 9/2005 | Carter et al. |
| 6,962,181 B2 | 11/2005 | Deevers et al. |
| 6,964,284 B2 | 11/2005 | Eckhardt |
| 6,968,869 B2 | 11/2005 | Eckhardt |
| 6,992,119 B2 | 1/2006 | Kojima et al. |
| 7,004,217 B1 * | 2/2006 | Yamagiwa .................... 152/502 |
| 7,021,848 B1 | 4/2006 | Gruenbacher et al. |
| 7,040,653 B1 | 5/2006 | Breed |
| 7,047,841 B2 | 5/2006 | Ragan et al. |
| 7,073,550 B2 | 7/2006 | Reiter et al. |
| 7,195,683 B2 | 3/2007 | Naito et al. |
| 2001/0007271 A1 | 7/2001 | Rustad et al. |
| 2001/0027246 A1 * | 10/2001 | Murayama et al. ........... 528/492 |
| 2004/0103967 A1 | 6/2004 | Majumdar et al. |
| 2004/0149366 A1 | 8/2004 | Makino et al. |
| 2004/0159386 A1 | 8/2004 | Deevers et al. |
| 2004/0259968 A1 * | 12/2004 | Krebs ............................ 521/170 |
| 2005/0034799 A1 | 2/2005 | Serra et al. |
| 2005/0113502 A1 | 5/2005 | Fitzharris Wall et al. |
| 2005/0205186 A1 * | 9/2005 | Wall et al. ..................... 152/504 |
| 2005/0215684 A1 | 9/2005 | Fitzharris Wall |
| 2006/0182371 A1 | 8/2006 | Borchardt |
| 2007/0044883 A1 | 3/2007 | D'Sidocky et al. |
| 2008/0156408 A1 | 7/2008 | Sekiguchi et al. |
| 2008/0264549 A1 | 10/2008 | Shih |

FOREIGN PATENT DOCUMENTS

| | | | |
|---|---|---|---|
| EP | 1435301 A1 | 7/2004 | |
| EP | 1437371 A1 | 7/2004 | |
| EP | 1533108 A2 | 5/2005 | |
| EP | 1533108 A3 | 5/2005 | |
| EP | 1580232 A1 | 9/2005 | |
| EP | 1714802 A1 | 10/2006 | |
| EP | 1942017 A1 | 7/2008 | |
| GB | 2146959 A | 5/1985 | |
| JP | 53-83207 * | 7/1978 | ............. B60C 21/08 |
| JP | 53-114882 * | 10/1978 | ............. B60C 21/08 |
| JP | 2004322811 | 11/2004 | |
| WO | 2006/095862 A1 | 9/2006 | |
| WO | 2006095862 | 9/2006 | |
| WO | 2007/049570 A1 | 5/2007 | |
| WO | 2008/071361 A1 | 6/2008 | |

OTHER PUBLICATIONS

English Language Abstract for JP 53-83207.*
English Translation for JP 53-114882.*
Chemcial Degradation of Polyurethane Vincent Gajewski Rubber World Sep. 1, 1990 http://www.thefreelibrary.com/Chemical+degradation+of+polyurethane.-a09000712.*
European Patent Office, European Search Report in corresponding EP Application Serial No. 08165392.5-2425, Nov. 25, 2008, 4 pages.
European Patent Office, European Search Report in corresponding EP Application Serial No. 08164764.6-2307, Dec. 22, 2008, 6 pages.
Case Corporation, "Tires: Galaxy Tire Program", Aug. 1997, pp. 1-19, PM-5960.
European Patent Office, European Search Report in corresponding EP Application Serial No. 08164602.8-2109, issued Feb. 23, 2009, 4 pages.

(56) References Cited

OTHER PUBLICATIONS

European Patent Office, European Search Report in corresponding EP Application Serial No. 08164606.9-2307, Dec. 17, 2008, 7 pages.
United States Patent and Trademark Office, Office Action issued in U.S. Appl. No. 11/865,167, dated Oct. 13, 2010. (10 pages.).
United States Patent and Trademark Office, Office Action issued in U.S. Appl. No. 11/863,994, dated Nov. 9, 2010. (10 pages.).
United States Patent and Trademark Office, Office Action issued in U.S. Appl. No. 11/865,167, dated Mar. 15, 2011. (9 pages.).
United States Patent and Trademark Office, Office Action issued in U.S. Appl. No. 11/863,994, dated Apr. 13, 2011. (14 pages).
United States Patent and Trademark Office, Final Office Action issued in U.S. Appl. No. 11/865,167, dated Jul. 12, 2011. (10 pages).
United States Patent and Trademark Office, Non-Final Office Action issued in U.S. Appl. No. 11/865,167, dated Feb. 14, 2012. (14 pages).
Machine-generated English translation of JP2004322811.
English translation of JP53-114882.
United States Patent and Trademark Office, Non-Final Office Action issued in U.S. Appl. No. 11/863,994, dated Jul. 19, 2011. (10 pages).
United States Patent and Trademark Office, Non-Final Office Action issued in U.S. Appl. No. 11/863,994, dated Nov. 22, 2011. (20 pages).
United States Patent and Trademark Office, Non-Final Office Action issued in U.S. Appl. No. 11/863,994, dated Apr. 11, 2012. (16 pages).

* cited by examiner

PNEUMATIC TIRE HAVING BUILT-IN SEALANT LAYER AND PREPARATION THEREOF

CROSS-REFERENCE

The present invention is related to U.S. Ser. No. 11/858,990, filed Sep. 21, 2007; U.S. Ser. No. 11/863,994, filed Sep. 28, 2007; and U.S. Ser. No. 11/865,167, filed Oct. 1, 2007, all of which are entitled "Pneumatic Tire Having Built-In Sealant Layer and Preparation Thereof".

FIELD OF THE INVENTION

The present invention is directed to a pneumatic tire having a built-in sealant layer and its preparation.

BACKGROUND OF THE INVENTION

Various methods, sealants and tire constructions have been suggested for pneumatic tires relating to the use of liquid sealant coatings in which the sealant flows into a puncture hole. However, such liquid sealants can flow excessively at elevated temperatures and cause the tire to become out of balance. Also, the liquid sealant may not be entirely operable or effective over a wide temperature range extending from summer to winter conditions. More complicated tire structures which encase a liquid sealant in a vulcanized rubber material can be expensive to manufacture and can also create balance and suspension problems due to the additional weight required in the tire.

Puncture sealing tires also have been further proposed wherein a sealant layer of degradable butyl based rubber, for example, is assembled between unvulcanized tire layers to provide a built-in sealant. By laminating the sealant layer between two or more non-degraded rubber layers, e.g., the tire inner liner and a tire carcass, the sealant layer retains its structural integrity during the vulcanization operation where high pressures are applied to the tire, which would otherwise displace the degraded rubber layer from its desired location. However, the compounds that typically are used in the built-in sealant, e.g., organic peroxide depolymerized butyl based rubber, can generate gases at higher temperature, such as during the tire cure or during tire use, which can result in aesthetically unappealing inner liner blister formation. Aside from being unappealing, such blister formation may allow the sealant to unfavorably migrate away from its intended location. To combat blister formation, the inner liner, for example, can be provided at an increased thickness but this can add to the cost of building a tire.

It is also known to directly apply sealant layers to tires after the cure process, or post cure. Such sealant layers generally are adhesively secured to the exposed surface of the innermost inner liner. Other sealant layers applied after cure may be tacky and gel-like which themselves act as adhesives. However, this procedure of applying sealant layers post cure involves extra materials and steps and thus significantly increases the cost of manufacturing a tire.

Accordingly, there is a need for a simple and practical method of preparing such a self-sealing tire that eliminates or reduces blister formation in the tire inner liner.

SUMMARY OF THE INVENTION

The present invention is directed to a pneumatic tire having a built-in sealant layer and the method of manufacturing such tire.

In one embodiment, the pneumatic tire with built-in sealant layer, before cure, includes an unvulcanized pneumatic tire assembly, which includes an outer circumferential rubber tread and a supporting carcass. A precursor sealant layer is situated between the supporting carcass and an innermost rubber inner liner. The precursor sealant layer is self-supporting and includes a non-flowing polyurethane composition that is neither gel-like nor substantially non-tacky. The precursor sealant layer provides self-sealing properties to a pneumatic tire after vulcanization of the unvulcanized pneumatic tire assembly. Specifically, the precursor sealant layer, during curing, thermally degrades so as to provide a gel-like and tacky, self-healing polyurethane composition which defines the built-in sealant layer. The pneumatic tire, with its innermost polyurethane composition, allows for elimination or reduction in blister formation by reducing or elimination the amount of gases typically given off by organoperoxide-butyl based sealant layers such as when the tire is at its running temperature. Consequently, the thickness of the inner liner may be reduced.

The pneumatic tire, in one embodiment, can be prepared by positioning a rubber inner liner on a tire-building apparatus. A precursor sealant layer, which is self-supporting and includes a non-flowing polyurethane composition that is neither gel-like nor substantially tacky, is positioned directly on the rubber inner liner. A tire carcass then is disposed outwardly of the precursor sealant layer followed by a rubber tire tread on the tire carcass to define an unvulcanized tire assembly. The unvulcanized tire assembly then is vulcanized under conditions of heat and pressure. During curing, the precursor sealant layer thermally degrades to give a gel-like and tacky polyurethane composition thereby defining the built-in sealant layer and providing the pneumatic tire with self-sealing properties.

By virtue of the foregoing, there is provided a pneumatic tire that has an ability to seal against various puncturing objects and can eliminate or reduce inner liner blister formation in the tire, for example.

BRIEF DESCRIPTION OF THE DRAWINGS

The accompanying drawings, which are incorporated in and constitute a part of this specification, illustrate embodiments of the invention and, together with the general description of the invention given above, and detailed description given below, serve to explain the invention.

DETAILED DESCRIPTION

Figure 1:
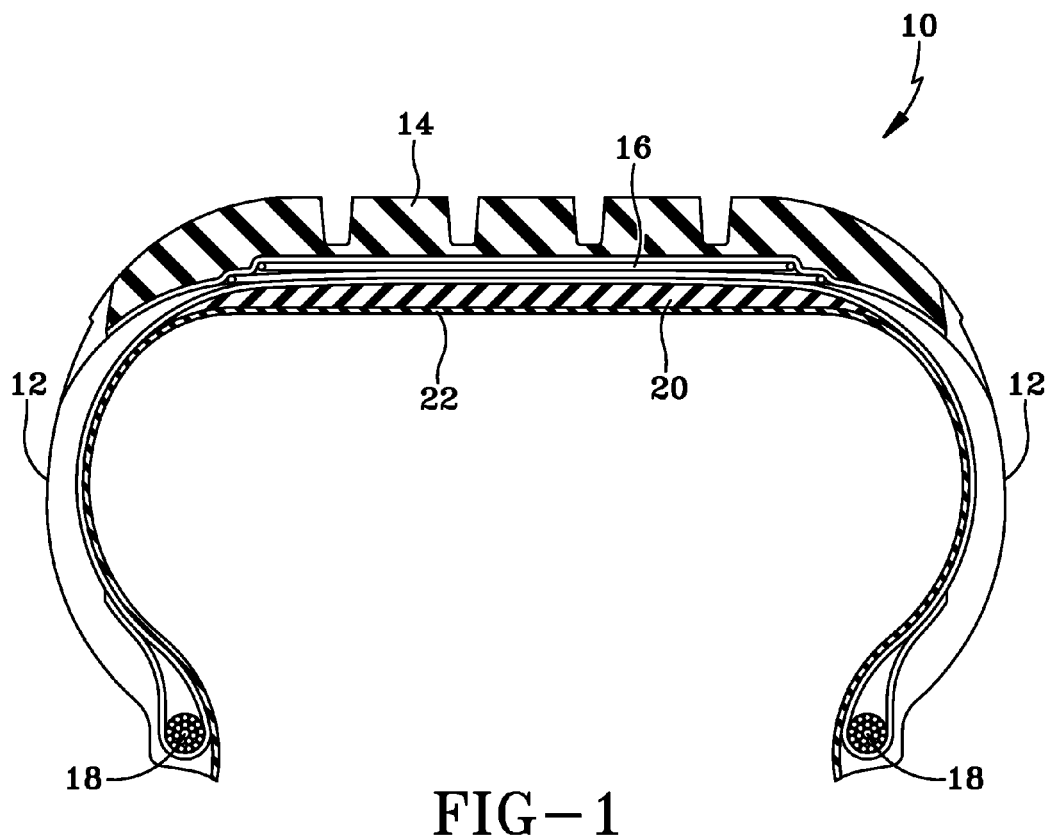
FIG. 1 is a cross-sectional view of a pneumatic tire in accordance with one embodiment of the present invention.

FIG. 1 shows a pneumatic tire 10 that has an ability to seal punctures and has the ability to eliminate or reduce blister formation in the tire 10, particularly inner liner blister formation. The tire 10 includes sidewalls 12, an outer circumferential rubber tread (or tread portion) 14, a supporting carcass 16, inextensible beads 18, a built-in sealant layer 20, and an innermost rubber inner liner 22. The individual sidewalls 12 extend radially inward from the axial outer edges of the tread portion 14 to join the respective inextensible beads 18. The supporting carcass 16 acts as a supporting structure for the tread portion 14 and sidewalls 12. The sealant layer 20 is disposed inwardly from the supporting carcass 16 and situated adjacent the rubber inner liner. The outer circumferential tread 14 is adapted to be ground contacting when the tire 10 is in use.

The rubber tire inner liner 22 may be any known rubber inner liner for use in pneumatic tires 10. In one example, the rubber inner liner 22 can be a sulfur curative-containing halobutyl rubber composition of a halobutyl rubber such as for example chlorobutyl rubber or bromobutyl rubber. Such tire halobutyl rubber based inner liner layer may also contain one or more sulfur curable diene-based elastomers such as, for example, cis 1,4-polyisoprene natural rubber, cis 1,4-polybutadiene rubber and styrene/butadiene rubber, or mixtures thereof. The inner liner 22 is normally prepared by conventional calendering or milling techniques to form a strip of uncured compounded rubber of appropriate width, which is sometimes referred to as a gum strip. Tire inner liners and their methods of preparation are well known to those having skill in such art. When the tire 10 is cured, the inner liner 22 becomes an integral, co-cured, part of the tire 10.

The built-in sealant layer 20, prior to vulcanization of the pneumatic tire 10, is referred to herein as a precursor sealant layer 23. The precursor sealant layer 23 is self-supporting and includes a non-flowing, or non-liquid, polyurethane composition that is neither gel-like nor substantially tacky. Concerning self-supporting, the polyurethane composition of the precursor sealant layer 23 should maintain its form, e.g., as a sheet or layer, without a need to be laminated to one or more supporting structures. Also, the polyurethane composition is substantially non-tacky in that a sheet of the polyurethane composition, for example, may contact another sheet yet be pulled apart with relative ease and still substantially maintain its original form. The polyurethane composition can include a self-healing polyurethane elastomeric material, which may contain, for example, methylene diphenyl 4,4'-diisocyanate (MDI) and poly(alkylene oxide)glycol. Suitable polyurethane compositions for use as the precursor sealant layer 23 may be obtained from Novex of Wadsworth, Ohio. By way of example, a polyurethane composition that is unsuitable for use in the present invention is Tyrlyner® available from VITA Industrial Inc. of Thomasville, Ga. Such polyurethane composition is gel-like, tacky, and further does not provide a self-supporting layer of such material.

After vulcanization, the non-flowing polyurethane composition thermally degrades to give a gel-like and tacky polyurethane composition that provides the pneumatic tire 10 with self-sealing properties and defines the built-in sealant layer 20.

The resulting built-in sealant layer 20 (and precursor sealant layer 23) may further include a colorant to provide a non-black colored built-in sealant layer having the capability of visibly identifying a puncture wound. That puncture wound may extend through a black colored rubber inner liner layer, black colored rubber tire tread, and/or black colored sidewall layer to the built-in sealant layer by a physical flow of a portion of the non-black colored built-in sealant layer through the puncture wound to form a contrastingly non-black colored sealant on a visible surface of the black colored inner liner, tread, or sidewall.

The colorant may include titanium dioxide. For example, the colorant of the sealant layer 20 may be titanium dioxide where a white colored sealant layer is desired. Also, such colorant may include titanium dioxide as a color brightener together with at least one non-black organic pigment and/or non-black inorganic pigment or dye. Various colorants may be used to provide a non-black color to the sealant layer 20. Representative of such colorants are, for example, yellow colored colorants as Diarylide Yellow™ pigment from Poly-One Corporation and Akrosperse E-6837™ yellow EPMB pigment masterbatch with an EPR (ethylene/propylene rubber) from the Akrochem Company.

The polyurethane compositions in the resulting sealant layer 20 (and precursor sealant layer 23) may further include one or more of the additional components, such as reinforcing filler, e.g., carbon black, silica, coal dust, fibers, or microspheres, processing oil, and other diene-based liquid polymers, for example, such as in conventional amounts. It should be understood by one having ordinary skill in the art that additional components may be included in the sealant layer 20 as desired, such as antidegradants, accelerators, etc., in conventional amounts.

The components of the precursor sealant layer 23, prior to building the tire 10, can be mixed together using conventional rubber mixing equipment, particularly an internal rubber mixer. The polyurethane composition for use in the precursor sealant layer 23 is self-supporting so as to enable its incorporation into an unvulcanized tire without departing from standard tire building techniques and without the use of complicated, expensive tire building equipment.

The precursor sealant layer 23, prior to building of the tire 10, can be formed into sheet stock that can be cut into strips, for example, and then positioned on a tire building apparatus 30, such as a tire drum, during the tire build-up process. The tire building process is described in detail further below.

The tire carcass 16 generally may be any conventional tire carcass for use in pneumatic tires 10. Generally, the tire carcass 16 includes one or more layers of plies and/or cords to act as a supporting structure for the tread portion 14 and sidewalls 12. The remainder of the tire components, e.g., tire tread 14, sidewalls 12, and reinforcing beads 18, also generally may be selected from those conventionally known in the art. The tire carcass 16, tire tread 14, and beads 18 and their methods of preparation are well known to those having skill in such art.

Figure 2:
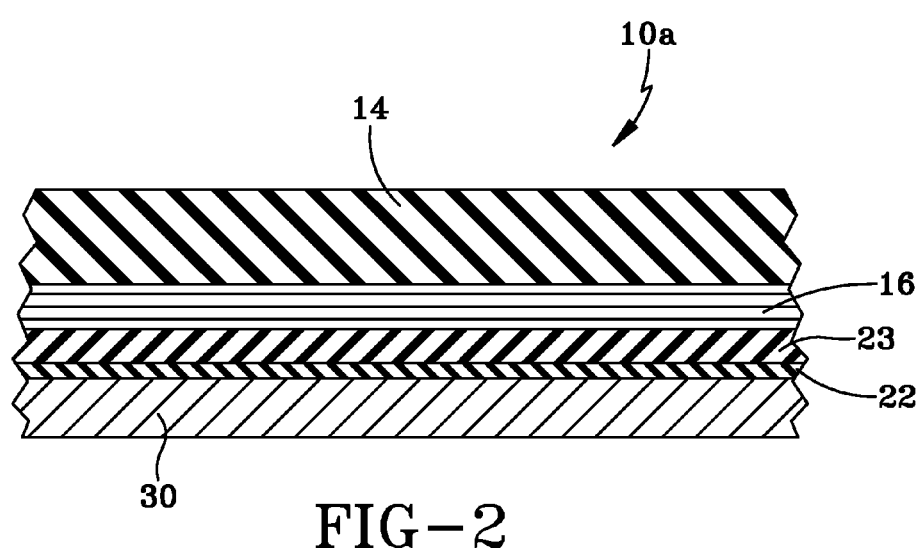
FIG. 2 is a cross-sectional view partially broken away of an unvulcanized tire assembly prepared in accordance with one embodiment of the present invention.

The pneumatic tire of FIG. 1 may be prepared, as best shown in FIG. 2, by building precursor sealant layer 23 into an unvulcanized tire assembly 10a using tire drum 30 and conventional tire building techniques. More specifically, the innermost rubber inner liner 22 is first situated or positioned on the tire drum 30, such as by being wrapped thereound, with the remainder of the uncured tire 10a being subsequently built thereon.

With continuing reference to FIG. 2, the precursor sealant layer 23, which is self-supporting and includes a non-flowing polyurethane composition that is neither gel-like nor substantially tacky, is positioned directly on the rubber inner liner 22. For example, the polyurethane composition can be formed into a strip of unvulcanized rubber, by using conventional equipment such as a calender, extruder, or any combination thereof. The thickness of the strip can vary in the unvulcanized tire. Generally, the thickness may range from about 0.13 cm (0.05 inches) to about 1.9 cm (0.75 inches). In passenger tires, the precursor sealant layer may have a thickness of about 0.32 cm (0.125 inches) whereas for truck tires, the precursor sealant layer 23 may have a thickness of about 0.76 cm (0.3 inches). The built-in sealant layer 20 is generally situated in the crown region of the tire 10, and may include colorant so that it is of a non-black color that may contrast with the black colored innerliner, tread, or sidewall so that a tire puncture can be noticed.

Finally, the tire carcass 16 is situated, or disposed outwardly, of the precursor sealant layer 23 then the rubber tire tread 14 is positioned on the tire carcass 16 thereby defining unvulcanized tire assembly 10a.

After the unvulcanized pneumatic tire 10a is assembled, the tire 10a is shaped and cured using a normal tire cure cycle. During curing, the polyurethane composition is thermally degraded to give a gel-like and tacky polyurethane composition that provides the pneumatic tire 10 with self-sealing properties and defines the built-in sealant layer 20.

Generally, the tire 10a can be cured over a wide temperature range. For example, passenger tires might be cured at a temperature ranging from about 130° C. to about 170° C. and truck tires might be cured at a temperature ranging from about 150° C. to about 180° C. Thus, a cure temperature may range, for example, from about 130° C. to about 180° C. and for a desired period of time. In one example, the tire assembly 10a is cured in a suitable mold at a temperature in a range of from about 150° C. to about 175° C. for a sufficient period of time to thermally degrade the polyurethane thereby forming the built-in sealant layer 20 which has puncture sealing properties.

After vulcanization, the polyurethane composition of the built-in sealant 20, as stated above, is gel-like and tacky to provide the pneumatic tire 10 with self-sealing properties. The tire 10, with its polyurethane composition, allows for elimination or reduction in blister formation by reducing or elimination the amount of gases typically given off by organoperoxide-butyl based sealant layers, for example, such as when the tire is at its running temperature. Consequently, the thickness of the inner liner 22 may be reduced.

Non-limiting examples of test pieces of the pneumatic tire 10 with built-in sealant 22 in accordance with the detailed description are now disclosed below. These examples are merely for the purpose of illustration and are not to be regarded as limiting the scope of the invention or the manner in which it can be practiced. Other examples will be appreciated by a person having ordinary skill in the art.

Two pneumatic tire test pieces were prepared for testing. Each test piece is described below.

Test Piece No. 1

The following layers were assembled one on top of the other:
7"×7" calendared tread of thickness 0.1"
4"×4" wire of thickness 0.068"
7"×7" belt (aligned with the wire) of thickness 0.026"
4"×4" polyurethane based precursor sealant layer of thickness 0.08"
7"×7" liner compound of thickness 0.03"

The above laminated test piece was cured for 35 minutes at 150° C. and 200 psi.

Control Test Piece

The following layers were assembled one on top of the other:
7"×7" calendared tread of thickness 0.042"
4"×4" wire of thickness 0.068"
7"×7" belt (aligned with the wire) of thickness 0.026"
4"×4" butyl based precursor sealant layer of thickness 0.25"
7"×7" inner liner compound of thickness 0.027"

The above laminated test piece was cured for 35 minutes at 150° C. and 200 psi.

Concerning test piece no. 1, the polyurethane based precursor sealant layer was purchased from Novex, Inc. of Wadsworth, Ohio. That polyurethane composition is a polyurethane based material containing methylene diphenyl 4,4'-diisocyanate (MDI) and poly(alkylene oxide)glycol. In addition, the function of molecular weight of the polyurethane composition was determined by inverse of solid state NMR relaxation times. The molecular weight function values for the polyurethane before cure was about 0.416 and after cure was about 0.344. The butyl-based composition used for the precursor sealant layer in the control is set forth below in Table I. That composition was prepared in a two-step process with the butyl rubber and the specified ingredients being mixed in a first non-productive step. In a second step, peroxide was mixed into the butyl rubber mixture.

TABLE I

Composition of Butyl Based Sealant

| Component | Stage | Amount (phr) |
|---|---|---|
| Butyl rubber | Non-productive 1 (NP1) | 100.00 |
| Medium processing oil | NP1 | 3.00 |
| Silica | NP1 | 20.00 |
| Clay | NP1 | 10.00 |
| Titanium dioxide | NP1 | 2.0 |
| Dusting agent | NP1 | 0.5 |
| Yellow pigment | NP1 | 1.00 |
| NP1 | Productive | 136.5 |
| Peroxide | Productive | 12.00 |
| Total | | 148.50 |

Yellow pigment, Akrochem E-6837

The cured test pieces were tested to evaluate puncture sealing effectiveness. In the testing process, each test piece was secured lengthwise across an open chamber of a box, which defined a benchtop nail hole tester, to generally seal the opening to the chamber. Each test piece was situated so that the innermost inner liner faced the open chamber and the tire tread faced outwardly. In the chamber, air pressure could be established via an inlet valve, maintained, and monitored to simulate a pressurized pneumatic tire. A nail was used to manually puncture the test piece. Each test piece was subjected to puncturing by nails of varying and increasing diameter to evaluate air pressure loss after nail insertion, removal, and reinflation (if needed). Air pressure readings at each step were taken after a two-minute period. The results of the puncture sealing testing are set out in Table II below.

TABLE II

Test Results

| | 1 | Control |
|---|---|---|
| Initial psi = 35 | 35 | 35 |
| After 0.136" diameter nail insertion | | |
| After nail removal | 35 | 32 |
| Re-inflation to 35 psi | Not needed | 35 |
| Initial psi = 35 | 35 | 35 |
| After 0.165" diameter nail insertion | | |
| After nail removal | 35 | 14 |
| Re-inflation to 35 psi | Not needed | 35 |
| Initial psi = 35 | 35 | 35 |
| After 0.235" diameter nail insertion | | |
| After nail removal | 35 | 0 |
| Re-inflation to 35 psi | Not Needed | 0 |

Based upon the test results, the puncture sealing properties of test pieces no. 1 is at least as good as the control. Specifically, the test results showed that test piece no. 1 could seal nail holes up to at least 0.235" in diameter by maintaining initial air pressure after nail removal. In other words, reinflation was not required.

The test pieces were also placed in an oven at 150° C. for 15 minutes to test for blister formation. Each test piece was then removed from the oven and visually observed. Blister formation was not detected in test piece no. 1. However, the control showed heavy blister formation in the innermost inner liner. This suggested that volatile gases, for example, given off during thermal degradation of the polyurethane was insignificant as compared to the butyl rubber based sealant.

Standard differential scanning calorimetry (DSC) testing was conducted on test piece no. 1 and the control test piece to evaluate glass transition temperatures (onset and inflection) of the sealant layer 20. The results are shown in Table III below.

TABLE III

Test results

| Sample | Tg ° C. (onset) | Tg ° C. (inflection) |
|---|---|---|
| Control | −70.8 | −66.1 |
| Test piece no. 1 | −66.8 | −63.6 |

The glass transition test results showed that the polyurethane composition can perform satisfactorily even if the temperature is low indicating that the polyurethane composition can be utilized over a broad temperature range.

Accordingly, there is provided a pneumatic tire 10 that has an ability to seal against various puncturing objects and can eliminate or reduce inner liner blister formation in the tire 10.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described. Accordingly, departures may be made from such details without departing from the scope of the general inventive concept.

What is claimed is:

1. An unvulcanized pneumatic tire assembly comprising:
an outer circumferential rubber tread, a supporting carcass therefor, and a precursor sealant layer situated between the supporting carcass and an innermost rubber inner liner defining the unvulcanized pneumatic tire assembly, the precursor sealant layer is self-supporting and includes a non-flowing polyurethane composition that is neither gel-like nor substantially tacky, but will thermally degrade upon tire vulcanization to give a gel-like and tacky polyurethane composition that provides self-sealing properties to a resulting pneumatic tire after vulcanization of the unvulcanized pneumatic tire assembly.

2. The unvulcanized pneumatic tire assembly of claim 1 wherein the non-flowing polyurethane composition is a polyurethane based material containing methylene diphenyl 4,4'-diisocyanate (MDI) and poly(alkylene oxide) glycol.

3. The unvulcanized pneumatic tire assembly of claim 2 wherein the non-flowing polyurethane composition includes a colorant.

4. The unvulcanized pneumatic tire assembly of claim 1 wherein the rubber inner liner is a sulfur curative-containing halobutyl rubber composition.

5. A method of preparing a pneumatic tire comprising:
positioning a rubber inner liner on a tire-building apparatus;
positioning a precursor sealant layer, which is self-supporting and includes a non-flowing polyurethane composition that is neither gel-like nor tacky, on the rubber inner liner;
disposing outwardly of the precursor sealant layer, a tire carcass followed by a rubber tire tread on the tire carcass to define an unvulcanized tire assembly; and
vulcanizing the unvulcanized tire assembly under conditions of heat and pressure such that the non-flowing polyurethane composition thermally degrades to give a gel-like and tacky polyurethane composition which provides the pneumatic tire with self-sealing properties.

6. The method of claim 5 wherein the non-flowing polyurethane composition is a polyurethane based material containing methylene diphenyl 4,4'-diisocyanate (MDI) and poly(alkylene oxide) glycol.

7. The method of claim 5 wherein the non-flowing polyurethane composition includes a colorant.

8. The method of claim 5 wherein the rubber inner liner is a sulfur curative-containing halobutyl rubber composition.

* * * * *